United States Patent
Hightower (10) Patent No.: US 11,522,375 B2
(45) Date of Patent: Dec. 6, 2022

(54) DC RECEPTACLE DEVICE CHARGER SLEEVE

(71) Applicant: Bailey Ross Hightower, Lamesa, TX (US)

(72) Inventor: Bailey Ross Hightower, Lamesa, TX (US)

( * ) Notice: Subject to any disclaimer, the term of this patent is extended or adjusted under 35 U.S.C. 154(b) by 0 days.

(21) Appl. No.: 17/500,807

(22) Filed: Oct. 13, 2021

(65) Prior Publication Data

US 2022/0173600 A1    Jun. 2, 2022

Related U.S. Application Data

(60) Provisional application No. 63/118,971, filed on Nov. 30, 2020.

(51) Int. Cl.
| | |
|---|---|
| *H01R 33/22* | (2006.01) |
| *H02J 7/00* | (2006.01) |
| *H01R 13/717* | (2006.01) |
| *H01R 31/06* | (2006.01) |
| *B60N 3/14* | (2006.01) |

(52) U.S. Cl.
CPC .......... *H02J 7/0042* (2013.01); *H01R 13/717* (2013.01); *H01R 31/065* (2013.01); *B60N 3/14* (2013.01)

(58) Field of Classification Search
CPC .. H01R 24/58; H01R 23/7073; H01R 23/688; H01R 2103/00; H01K 1/46
See application file for complete search history.

(56) References Cited

U.S. PATENT DOCUMENTS

| | | | | |
|---|---|---|---|---|
| 4,083,622 A | * | 4/1978 | Neidecker | H01R 13/187 439/86 |
| 4,662,706 A | * | 5/1987 | Foley | H01R 13/187 439/843 |
| 8,317,552 B2 | * | 11/2012 | Leroyer | H01R 13/18 439/839 |
| 9,917,399 B2 | * | 3/2018 | Gessford | H01R 24/40 |
| 2005/0095926 A1 | * | 5/2005 | Copper | H01R 43/16 439/843 |
| 2019/0363460 A1 | * | 11/2019 | Wasilko | H01R 4/203 |

* cited by examiner

*Primary Examiner* — Phuong Chi Thi Nguyen
(74) *Attorney, Agent, or Firm* — Jose W. Jimenez; Jimenez Law Firm (57) ABSTRACT

A charge sleeve assembly and kit for a vehicle auxiliary power outlet has a cylindrical electric plug assembly coupled to a cylindrical USB port assembly along a common axis with at least one USB port proximally facing. A cylindrical cover assembly is designed to circumscribe the cylindrical USB port assembly. At least one substantially L-shaped groove portion is disposed longitudinally along an interior surface of the cylindrical cover assembly with an open slot portion, running toward a proximal end of the cylindrical cover assembly and jogging perpendicularly substantially at the proximal end of the cylindrical cover assembly. At least one protruding tooth member is disposed on an exterior surface of the cylindrical USB port assembly and fits within the groove portion to slide longitudinally along the groove portion and along the perpendicular jog, allowing the cylindrical cover to axially rotate, the at least one tooth member restraining longitudinal movement of the cylindrical cover.

20 Claims, 11 Drawing Sheets

DC RECEPTACLE DEVICE CHARGER SLEEVE

CLAIM OF PRIORITY

This application claims the benefit of and priority to U.S. provisional application No. 63/118,971 filed on Nov. 30, 2020, titled DC RECEPTACLE DEVICE CHARGER SLEEVE, the content of which is incorporated by reference in its entirety.

FIELD OF THE INVENTION

The inventive concept relates generally to a car electrical device charger sleeve.

BACKGROUND

An automobile auxiliary power outlet (also known as a car outlet, automotive power socket, automobile outlet, vehicular outlet, and similar; formerly known as a cigarette lighter receptacle, cigar lighter receptacle or cigar lighter socket) in an automobile was initially designed to power an electrically heated cigarette lighter, but became a de facto standard DC connector to supply electrical power for portable accessories used in or near an automobile directly from a vehicle's electrical system. In most vehicles, at least one car outlet is present. The voltage of the power outlet is usually near 12 V DC, (14V to 15V while the running engine is turning the alternator to charge the car battery while providing electrical power), because it is directly powered without regulation from the car's electrical system.

Currently, there are a number of solutions for providing electrical car outlets with decorative elements. One of these solutions may have designs, but these designs are not interchangeable. Therefore, there currently exists a need in the market for an apparatus that allows for decorating a car charger and that is interchangeable.

SUMMARY OF THE INVENTION

A charge sleeve to a vehicle auxiliary power outlet has a cylindrical electric plug assembly designed to electrically couple at a distal portion of the cylindrical electric plug assembly to the vehicle auxiliary power outlet. A cylindrical USB port assembly is coupled to a proximal end of the cylindrical electric plug assembly along a common axis with an at least one USB port proximally facing for convenient access by a vehicle occupant. A substantially rigid, cylindrical cover assembly with an open proximal end and an open distal end is designed to circumscribe the cylindrical USB port assembly. At least one substantially L-shaped groove portion is disposed on an interior surface of the cylindrical cover assembly with an open slot portion at a proximal end of the cylindrical cover assembly, the groove portion running longitudinally substantially to a distal end of the cylindrical cover assembly, the groove portion jogging perpendicularly substantially at the distal end of the cylindrical cover assembly to follow partially along the interior circumference of the cylindrical cover assembly defined by the interior surface of the cover assembly. At least one protruding tooth member is disposed on an exterior surface of the cylindrical USB port assembly designed to fit within the groove portion, the tooth member allowing the cylindrical cover assembly to slide longitudinally along the groove portion and, at the perpendicular jog, allowing the cylindrical cover assembly to rotate along the common axis defined by the coupled cylindrical electric plug assembly and the cylindrical USB port assembly wherein the tooth member restrains longitudinal movement of the cylindrical cover assembly.

In one embodiment of the charge sleeve to a vehicle auxiliary power outlet, two USB ports are proximally facing. In one embodiment of the charge sleeve kit, at least one sleeve member is included that is designed to fit about a cylindrical plug assembly.

In one embodiment of the charge sleeve assembly or kit for a vehicle auxiliary power outlet, includes one or more interchangeable decorative secondary sleeve members circumscribe the cylindrical cover assembly. The decorative secondary sleeve members may be animal shapes, ball shapes, or other shapes and may have other functional or decorative elements such as lights.

It would be advantageous to have a charge sleeve to a vehicle auxiliary power outlet that is interchangeable. Furthermore, it would be advantageous to have a charge sleeve to a vehicle auxiliary power outlet that is portable. Still further, it would be advantageous to have a charge sleeve to a vehicle auxiliary power outlet that is USB compatible.

The inventive concept advantageously fills the aforementioned deficiencies by providing car charger sleeves, which provides for a fun way to decorate your car charger.

The inventive concept is a car phone charger cover.

The charge sleeve to a vehicle auxiliary power outlet has at least one USB port.

The charge sleeve to a vehicle auxiliary power outlet has a turn and lock connector sleeve also referred to as a cylindrical cover assembly.

The charge sleeve to a vehicle auxiliary power outlet fulfills the need for decorative car chargers.

Among other things, it is an advantage of the inventive concept to provide car charger sleeves that do not suffer from problems or deficiencies associated with prior solutions.

It is still further an advantage of the charge sleeve to a vehicle auxiliary power outlet to be interchangeable.

Still further, the charge sleeve to a vehicle auxiliary power outlet may have a dome housing.

The inventive concept now will be described more fully hereinafter with reference to the accompanying drawings, which are intended to be read in conjunction with both this summary, the detailed description and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Referring to the figures, FIG. 1-9 illustrates a charge sleeve 300 to a vehicle auxiliary power outlet 10 (not shown), that is usually found on a vehicle dashboard within a driver's reach or any convenient location in the vehicle cabin or on a vehicle frame, that is configured to receive a cylindrical electric plug assembly 100 designed to electrically couple or connect at a distal portion 110 of the cylindrical electric plug assembly 100 to the vehicle auxiliary power outlet. A cylindrical USB port assembly 200 is coupled to a proximal end 190 of the cylindrical electric plug assembly 100 along a common axis 120 with an at least one USB port 230 proximally facing for convenient access by a vehicle occupant.

Figure 1:
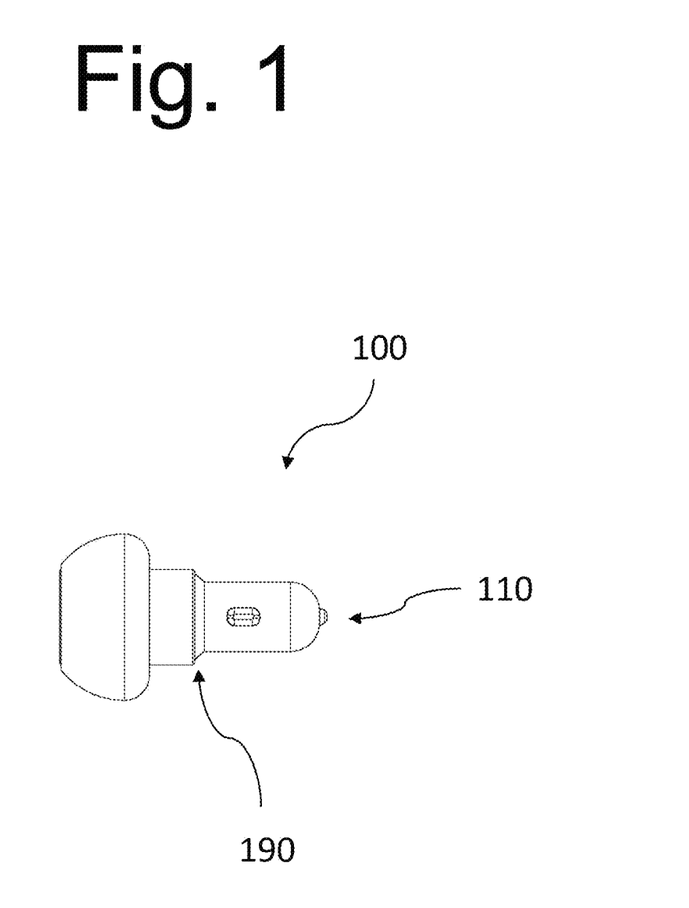
FIG. 1 illustrates the right side of the charge sleeve to a vehicle auxiliary power outlet.
Figure 2:
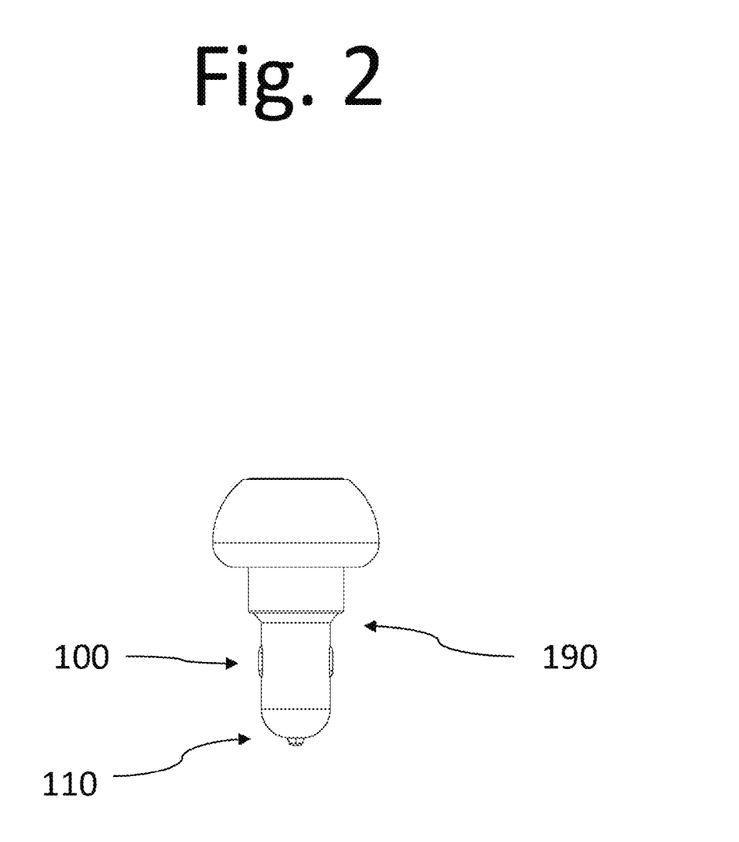
FIG. 2 illustrates the top of the charge sleeve to a vehicle auxiliary power outlet.
Figure 3:
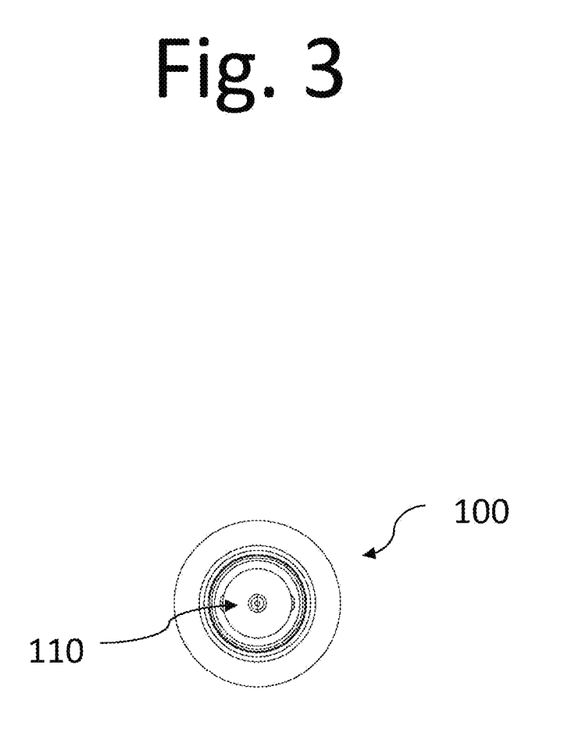
FIG. 3 illustrates the back of the charge sleeve to a vehicle auxiliary power outlet.
Figure 4:
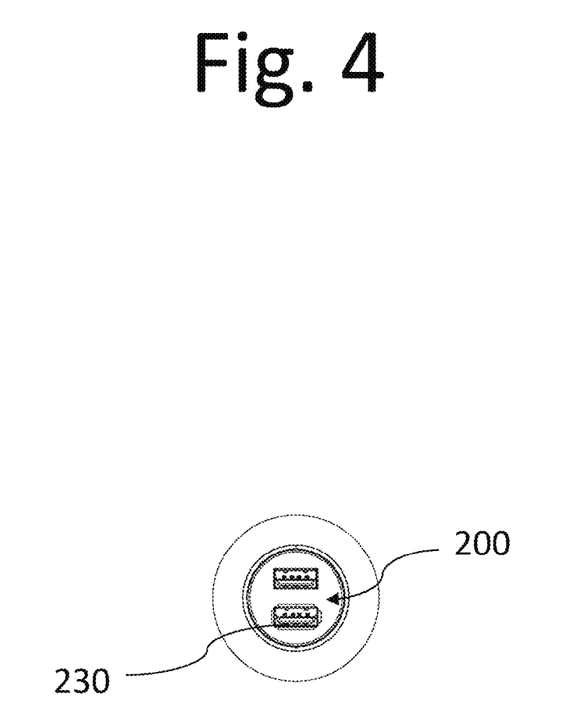
FIG. 4 illustrates the front of the charge sleeve to a vehicle auxiliary power outlet.
Figure 5:
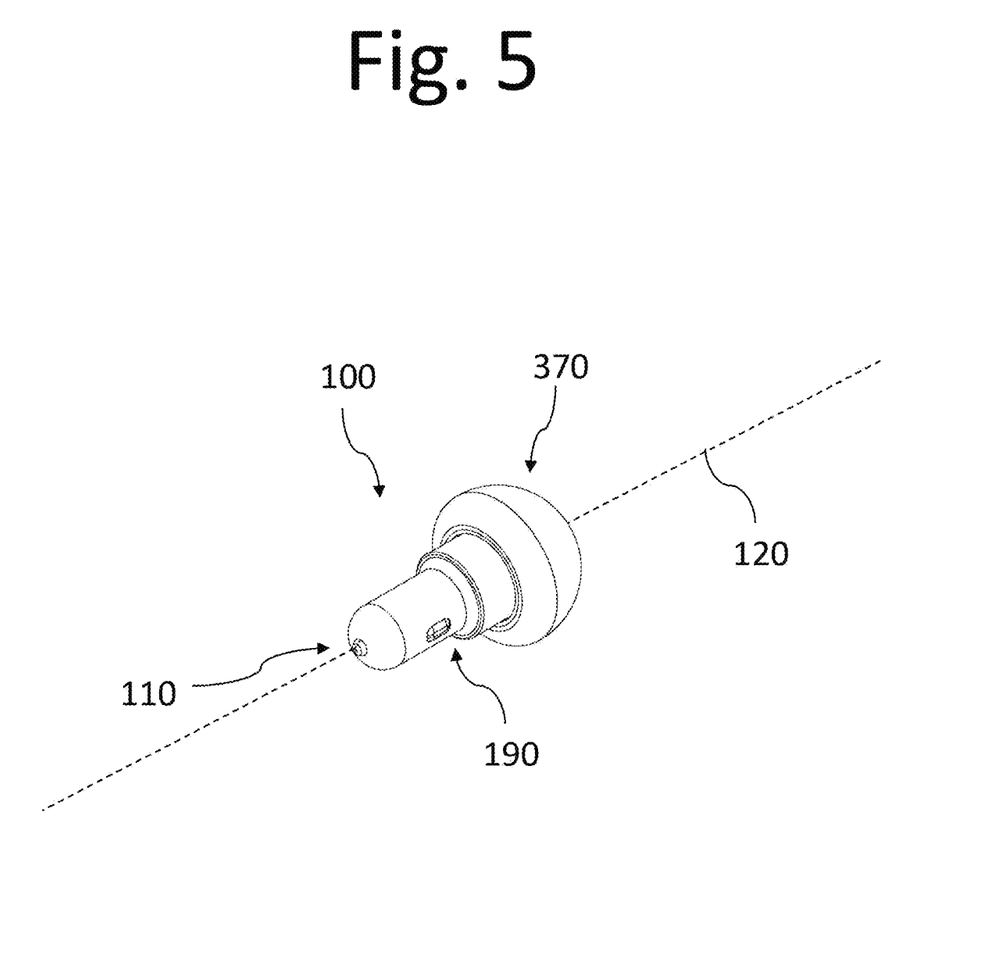
FIG. 5 illustrates the perspective view of the charge sleeve to a vehicle auxiliary power outlet.
Figure 6:
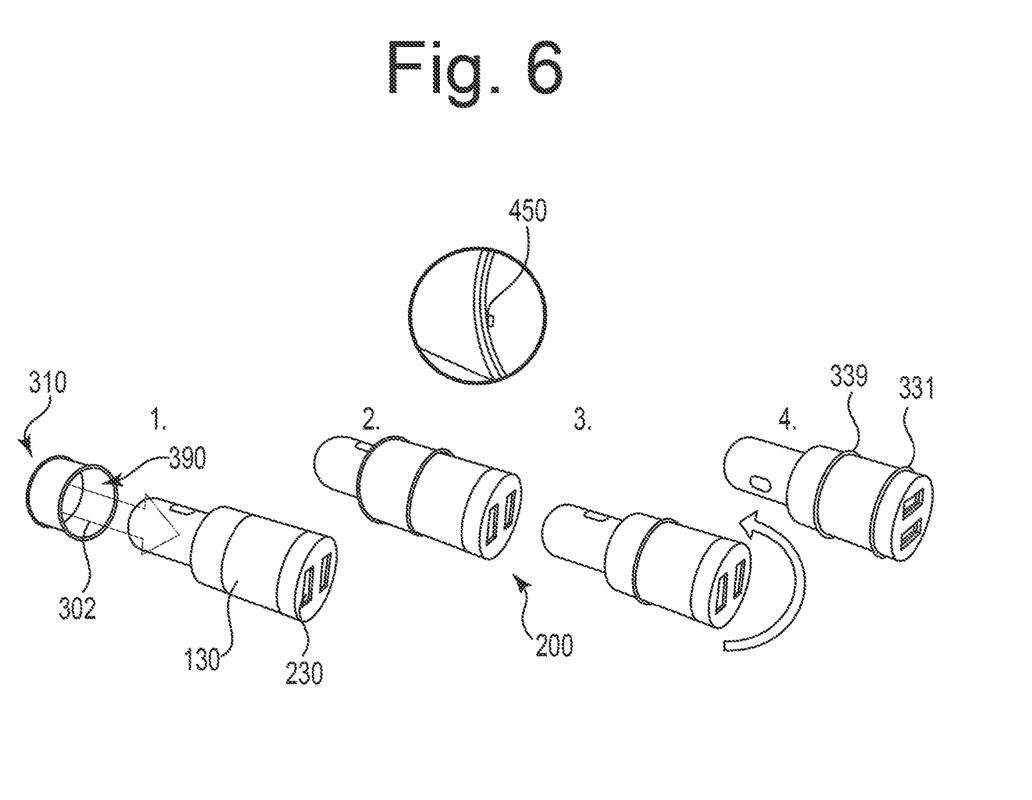
FIG. 6 illustrates the perspective view of the charge sleeve to a vehicle auxiliary power outlet with the cylindrical cover assembly off.
Figure 7:
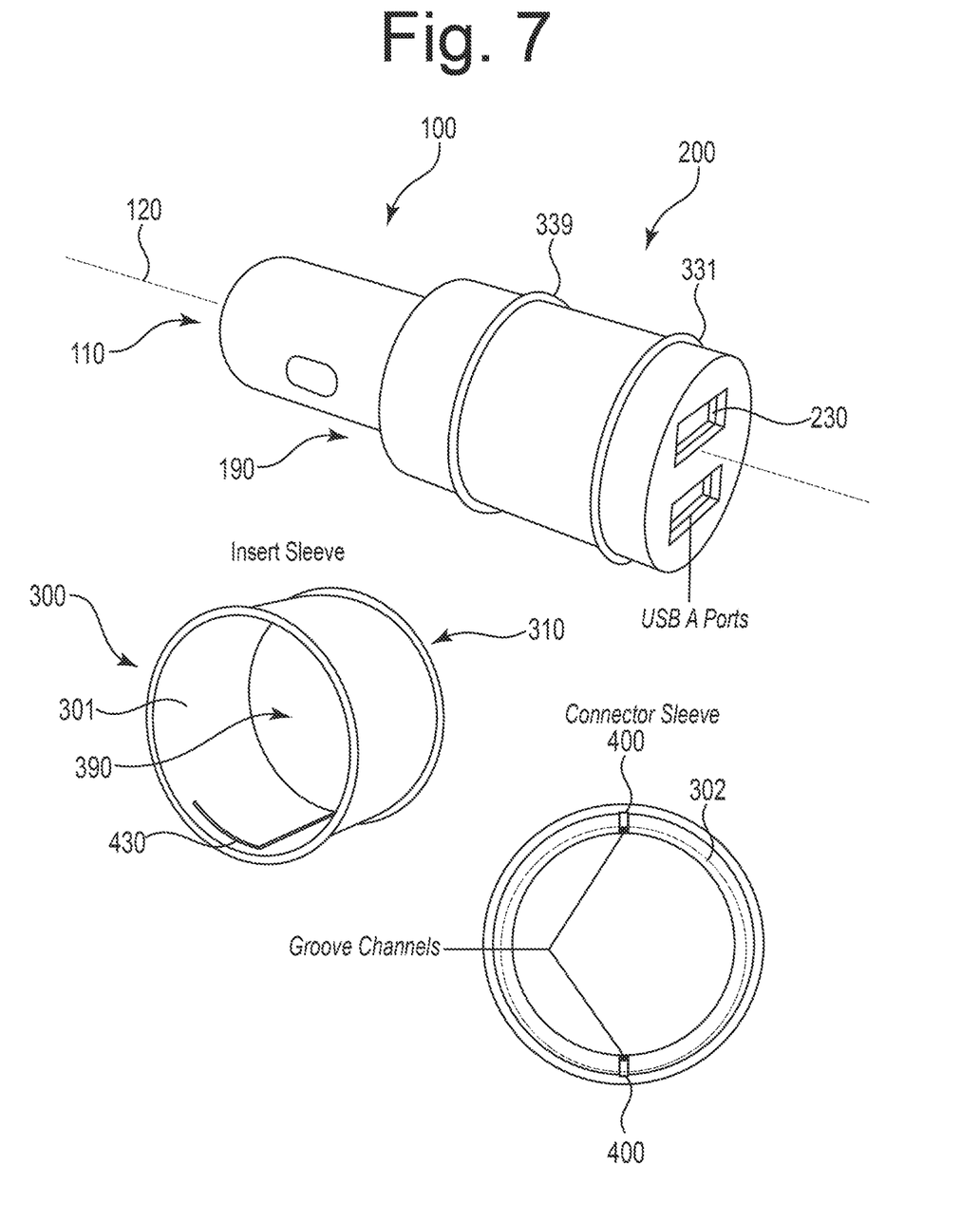
FIG. 7 illustrates the cylindrical cover assembly.

As illustrated in FIGS. 6-7, a substantially rigid, cylindrical cover or sleeve assembly 300 with an open proximal end 310 and an open distal end 390 is designed to circumscribe the cylindrical USB port assembly 200. FIG. 7 illustrates that at least one substantially L-shaped groove portion 400 is disposed on an interior surface of the cylindrical cover assembly 301 with an open slot portion 402 at the proximal end of the interior cylindrical cover assembly 310, the groove portion 400 running longitudinally substantially to the distal end of the cylindrical cover assembly 390, the groove portion jogging perpendicularly 430 substantially at the distal end 390 of the cylindrical cover assembly 300 to follow partially along the interior rim or circumference 302 of the cylindrical cover assembly 300 defined by the interior surface 301 of the cover assembly 300.

Figure 8:
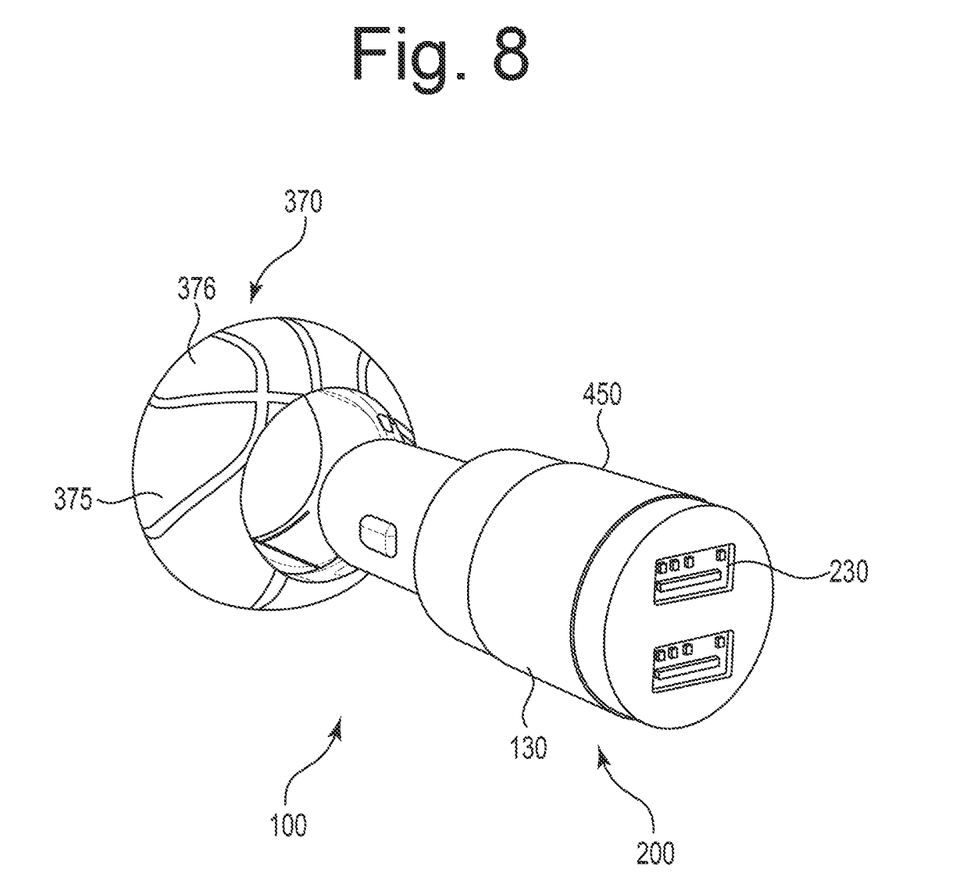
FIG. 8 illustrates a representative secondary sleeve member.

Referring to FIG. 8, at least one protruding tooth member 450 is disposed on an exterior surface 130 of the cylindrical USB port assembly 200 designed to fit within the groove portion 400, the tooth member 450 allowing the cylindrical cover assembly 300 to slide longitudinally along the groove portion 400 and, at the perpendicular jog 430, allowing the cylindrical cover assembly 300 to rotate along the common axis 120 defined by the coupled cylindrical electric plug assembly 100 and the cylindrical USB port assembly 200 wherein, as illustrated in FIG. 8, the tooth member 450 restrains longitudinal movement of the cylindrical cover assembly 300. In one embodiment of the inventive concept, the cylindrical cover assembly 300 has a proximal lip member 331 and a distal lip member 339. In one embodiment of the charge sleeve 300 to a vehicle auxiliary power outlet 10, two USB ports 230 are proximally facing.

Figure 9:
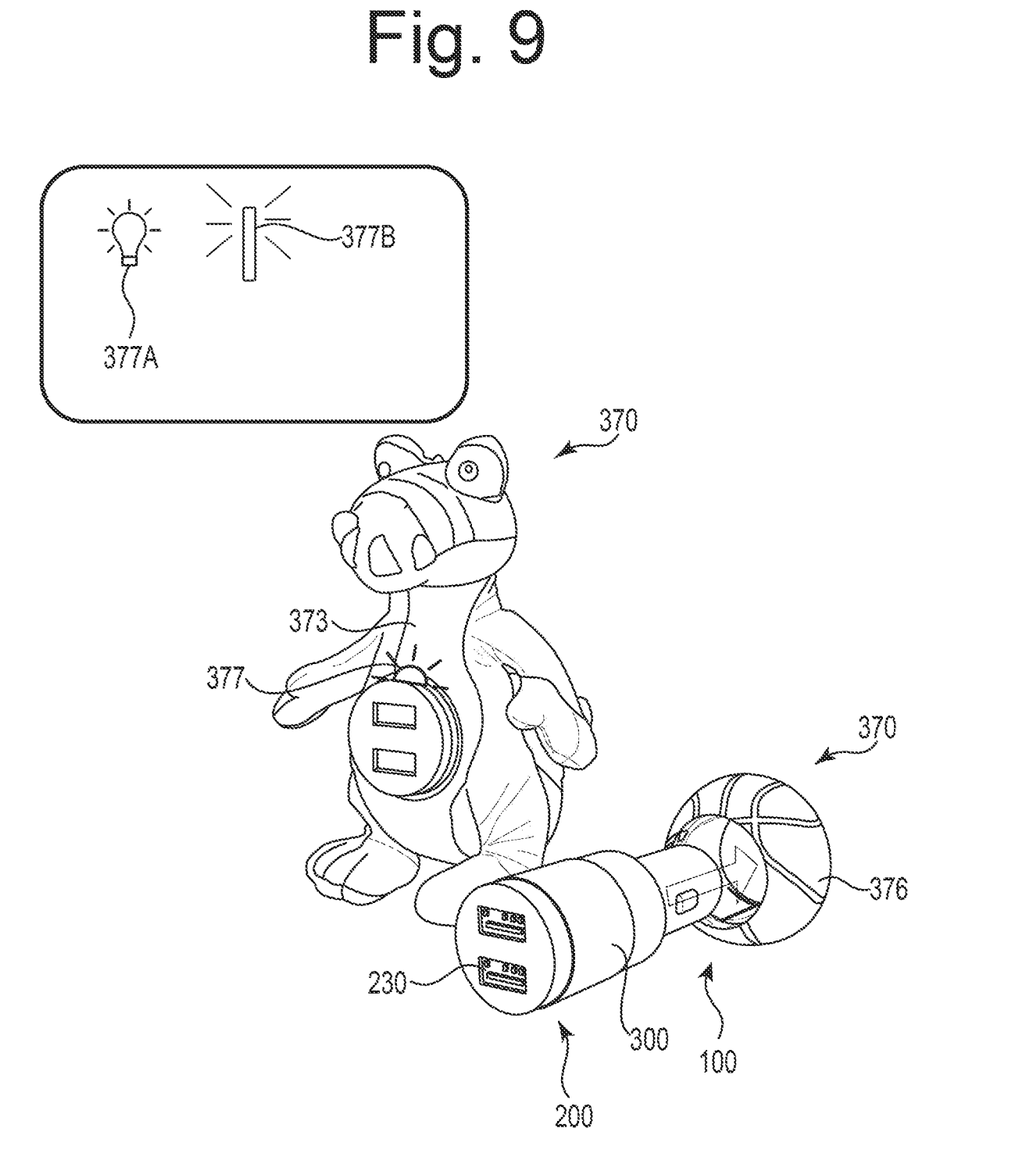
FIG. 9 illustrates additional representative secondary sleeve members.

As illustrated in FIG. 8-9, in this embodiment of charge sleeve 300 to a vehicle auxiliary power outlet 10, wherein one or more interchangeable decorative secondary sleeve members 370 circumscribe the cylindrical cover assembly 300. In one embodiment of the charge sleeve to a vehicle auxiliary power outlet, the decorative secondary sleeve member 370 is a plush FIG. 373 having at least one or more of a visually enhancing shape or color. In one embodiment of the charge sleeve to a vehicle auxiliary power outlet, the decorative secondary sleeve member 370 is a hardened polymer housing 376 having at least one or more of a visually enhancing shape or color. In one embodiment of the charge sleeve to a vehicle auxiliary power outlet, the decorative secondary sleeve member 370 has at least one light member 377, the light member 377 being at least one or more of electronically lit 377A (such as an LED) and photoluminescent member 377B.

In one embodiment of the charge sleeve to a vehicle auxiliary power outlet, the decorative secondary sleeve member 370 is a hardened polymer housing 376 having a plurality of at least one or more of grooves and knobs 375 consistent with the look and feel of a represented sports ball member.

Figure 10A:
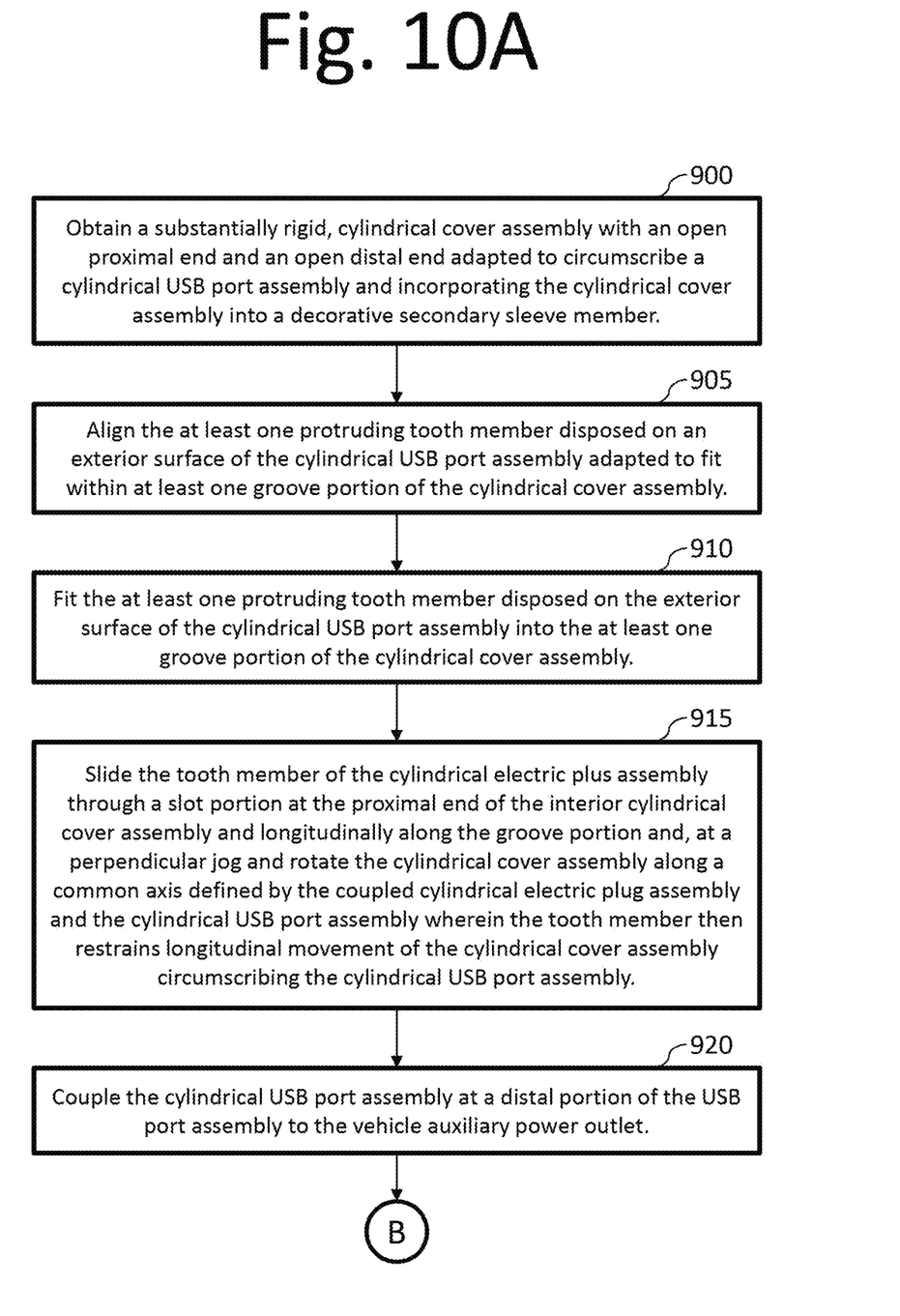
FIG. 10A-10B illustrates a method for using the charge sleeve to an auxiliary power outlet.
Figure 10B:
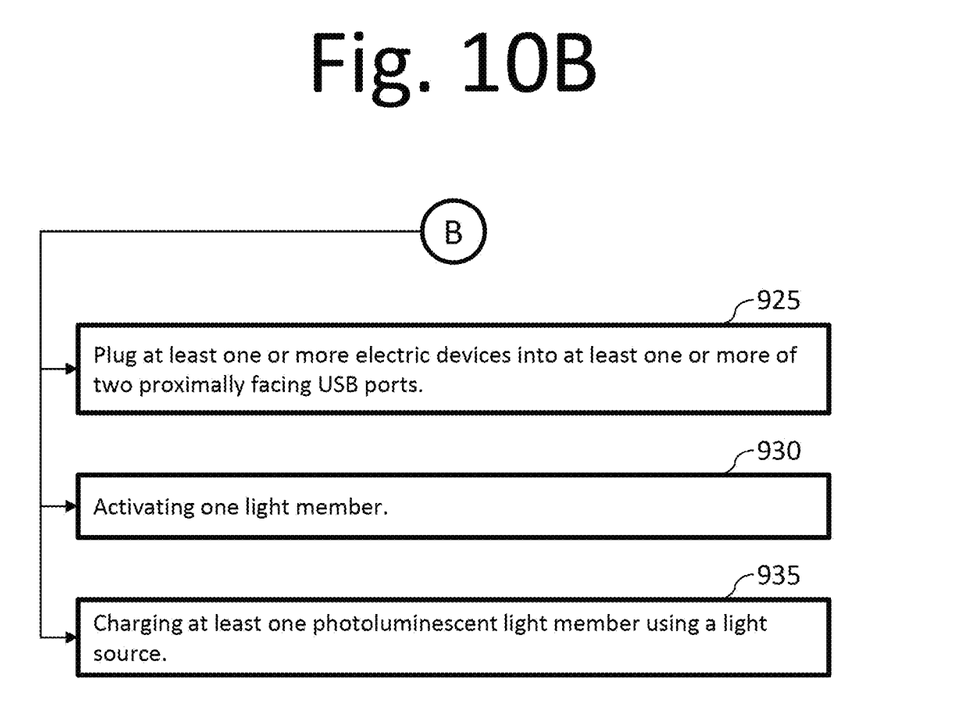

FIGS. 10A and 10B illustrate a method for using a charge sleeve for a vehicle auxiliary power outlet, the method 900 including, obtaining a substantially rigid, cylindrical cover assembly 300 with an open proximal end 310 and an open distal end 390 adapted to circumscribe a cylindrical USB port assembly 200 and incorporating the cylindrical cover assembly 300 into a decorative secondary sleeve member 370. The method further includes the step 905, aligning the at least one protruding tooth member 450 disposed on an exterior surface of the cylindrical USB port assembly 130 adapted to fit within at least one groove portion of the cylindrical cover assembly 400. The method further includes the step 910, fitting the at least one protruding tooth member 450 disposed on the exterior surface of the cylindrical USB port assembly 130 into the at least one groove portion of the cylindrical cover assembly 400.

The method 900 illustrated in FIGS. 10A and 10B further includes the step 915, sliding the tooth member 450 of the cylindrical electric plus assembly 100 through a slot portion 402 at the proximal end of the interior cylindrical cover assembly 310 and longitudinally along the groove portion 400 and, at a perpendicular jog 430, rotating the cylindrical cover assembly 300 along a common axis 120 defined by the coupled cylindrical electric plug assembly 100 and the cylindrical USB port assembly 200 wherein the tooth member 450 then restrains longitudinal movement of the cylindrical cover assembly 300 circumscribing the cylindrical USB port assembly 200. The method further includes the step 920, coupling the cylindrical USB port assembly 200 at a distal portion of the USB port assembly 120 to the vehicle auxiliary power outlet.

The method illustrated in FIGS. 10A and 10B may further include the step 925, plugging at least one or more electric devices into at least one or more of two proximally facing USB ports 230.

The method illustrated in FIGS. 10A and 10B may further include the step 930, activating at least one light member 377.

The method illustrated in FIGS. 10A and 10B may further include the step 935, charging at least one photoluminescent light member 377B using a light source.

The following patents are incorporated by reference in their entireties: U.S. Pat. Nos. 2004/0259464, 2007/0113306, and U.S. Pat. No. 7,237,347.

While the inventive concept has been described above in terms of specific embodiments, it is to be understood that the inventive concept is not limited to these disclosed embodiments. Upon reading the teachings of this disclosure, many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

The invention claimed is:

1. A charge sleeve assembly or kit to a vehicle auxiliary power outlet comprising:
   a cylindrical electric plug assembly adapted to electrically couple at a distal portion of the cylindrical electric plug assembly to the vehicle auxiliary power outlet;
   a cylindrical USB port assembly coupled to a proximal end of the cylindrical electric plug assembly along a common axis, an at least one USB port proximally facing;
   a substantially rigid, cylindrical cover assembly with an open proximal end and an open distal end adapted to circumscribe the cylindrical USB port assembly;
   at least one substantially L-shaped groove portion disposed on an interior surface of the cylindrical cover assembly with an open slot portion at a proximal end of the cylindrical cover assembly, the groove portion running longitudinally substantially to a distal end of the cylindrical cover assembly, the groove portion jogging perpendicularly substantially at the distal end of the cylindrical cover assembly to follow partially along the interior circumference of the cylindrical cover assembly defined by the interior surface of the cover assembly; and
   at least one protruding tooth member disposed on an exterior surface of the cylindrical USB port assembly adapted to fit within the groove portion, the tooth member allowing the cylindrical cover assembly to slide longitudinally along the groove portion and, at the perpendicular jog, allowing the cylindrical cover assembly to rotate along the common axis defined by the coupled cylindrical electric plug assembly and the cylindrical USB port assembly wherein the tooth member restrains longitudinal movement of the cylindrical cover assembly.

2. The charge sleeve to a vehicle auxiliary power outlet of claim 1 wherein two USB ports are proximally facing.

3. The charge sleeve to a vehicle auxiliary power outlet of claim 1 wherein one or more interchangeable decorative secondary sleeve members circumscribe the cylindrical cover assembly.

4. The charge sleeve to a vehicle auxiliary power outlet of claim 3 wherein the decorative secondary sleeve member is a plush figure having at least one or more of a visually enhancing shape or color.

5. The charge sleeve to a vehicle auxiliary power outlet of claim 3 wherein the decorative secondary sleeve member is a hardened polymer housing having at least one or more of a visually enhancing shape or color.

6. The charge sleeve to a vehicle auxiliary power outlet of claim 4 wherein the decorative secondary sleeve member has at least one light member, the light member being at least one or more of electronically lit and photoluminescent.

7. The charge sleeve to a vehicle auxiliary power outlet of claim 5 wherein the decorative secondary sleeve member has at least one light member, the light member being at least one or more of electronically lit and photoluminescent.

8. The charge sleeve to a vehicle auxiliary power outlet of claim 5 wherein the decorative secondary sleeve member is a hardened polymer housing having a plurality of at least one or more of grooves and knobs consistent with the look and feel of a represented sports ball member.

9. A charge sleeve assembly configured for use with a vehicle auxiliary power outlet, the auxiliary power outlet configured to receive a cylindrical electric plug assembly, the charge sleeve assembly comprising:
   a substantially rigid, cylindrical cover assembly with an open proximal end and an open distal end, the cylindrical cover assembly having a proximal lip member and a distal lip member, the cylindrical cover assembly adapted to circumscribe the cylindrical USB port assembly;
   two substantially L-shaped groove portions disposed on an interior surface of the cylindrical cover assembly with an open slot portion at a proximal end of the cylindrical cover assembly, the groove portion running longitudinally substantially to a distal end of the cylindrical cover assembly, the groove portion jogging perpendicularly substantially at the distal end of the cylindrical cover assembly to follow partially along the interior circumference of the cylindrical cover assembly defined by the interior surface of the cover assembly; and
   two protruding tooth members disposed on laterally opposite sides on an exterior middle surface of the cylindrical USB port assembly adapted to fit within the groove portion starting at a proximal end of the cylindrical cover assembly, the tooth member allowing the cylindrical cover assembly to slide longitudinally along the groove portion and, at the perpendicular jog, allowing the cylindrical cover assembly to rotate along the common axis defined by the coupled cylindrical electric plug assembly and the cylindrical USB port assembly wherein the tooth member restrains longitudinal movement of the cylindrical cover assembly and the USB ports are substantially affixed in at least one of a horizontal and vertical state.

10. The charge sleeve to a vehicle auxiliary power outlet of claim 9 wherein the electric plug assembly includes a cylindrical USB port assembly coupled to a proximal end of the cylindrical electric plug assembly along a common axis, the cylindrical USB port assembly having two parallelly aligned USB ports proximally or outwardly facing.

11. The charge sleeve kit to a vehicle auxiliary power outlet of claim 9 further includes one or more interchangeable decorative secondary sleeve members adapted to circumscribe the cylindrical cover assembly.

12. The charge sleeve kit or assembly to a vehicle auxiliary power outlet of claim 11 wherein the decorative secondary sleeve member is a plush figure having at least one or more of a visually enhanced shape or color.

13. The charge sleeve kit to a vehicle auxiliary power outlet of claim 11 wherein the decorative secondary sleeve member is a hardened polymer housing having at least one or more of a visually enhanced shape or color.

14. The charge sleeve kit to a vehicle auxiliary power outlet of claim 12 wherein the decorative secondary sleeve member has at least one light member, the light member being at least one or more of electronically lit or LED and photoluminescent element.

15. The charge sleeve kit to a vehicle auxiliary power outlet of claim 13 wherein the decorative secondary sleeve member has at least one light member, the light member being at least one or more of electronically lit or LED and photoluminescent element.

16. The charge sleeve kit to a vehicle auxiliary power outlet of claim 13 wherein the decorative secondary sleeve member is a hardened polymer housing having a plurality of at least one or more of grooves and knobs consistent with the look and feel of a represented sports ball member.

17. A method for using a charge sleeve for a vehicle auxiliary power outlet, the method comprising:

obtaining a substantially rigid, cylindrical cover assembly with an open proximal end and an open distal end adapted to circumscribe a cylindrical USB port assembly and incorporating the cylindrical cover assembly into a decorative secondary sleeve member;

aligning an at least one protruding tooth member disposed on an exterior surface of the cylindrical USB port assembly adapted to fit within at least one groove portion of the cylindrical cover assembly;

fitting the at least one protruding tooth member disposed on the exterior surface of the cylindrical USB port assembly into the at least one groove portion of the cylindrical cover assembly;

sliding the tooth member of the cylindrical cover assembly longitudinally along the groove portion and, at a perpendicular jog, rotating the cylindrical cover assembly along a common axis defined by the coupled cylindrical electric plug assembly and the cylindrical USB port assembly wherein the tooth member then restrains longitudinal movement of the cylindrical cover assembly circumscribing the USB port assembly; and coupling the USB port assembly at a distal portion of the USB port assembly to the vehicle auxiliary power outlet via the cylindrical USB port assembly.

18. The method for using a charge sleeve for a vehicle auxiliary power outlet of claim 17, the method further including plugging at least one or more electric devices into at least one or more of two proximally facing USB ports.

19. The method for using a charge sleeve for a vehicle auxiliary power outlet of claim 17, the method further including activating at least one light member.

20. The method for using a charge sleeve for a vehicle auxiliary power outlet of claim 17, the method further including charging at least one photoluminescent light member using a light source.

* * * * *